US011803414B2

(12) United States Patent
Chen et al.

(10) Patent No.: US 11,803,414 B2
(45) Date of Patent: Oct. 31, 2023

(54) DIAGONAL AUTOSCALING OF SERVERLESS COMPUTING PROCESSES FOR REDUCED DOWNTIME

(71) Applicant: Red Hat, Inc., Raleigh, NC (US)

(72) Inventors: Huamin Chen, Westborough, MA (US); Roland Huss, Petnitz (DE)

(73) Assignee: Red Hat, Inc., Raleigh, NC (US)

( * ) Notice: Subject to any disclaimer, the term of this patent is extended or adjusted under 35 U.S.C. 154(b) by 121 days.

(21) Appl. No.: 17/160,778

(22) Filed: Jan. 28, 2021

(65) Prior Publication Data

US 2022/0237024 A1 Jul. 28, 2022

(51) Int. Cl.
*G06F 9/48* (2006.01)
*G06F 9/455* (2018.01)
*G06F 9/50* (2006.01)

(52) U.S. Cl.
CPC .......... *G06F 9/4856* (2013.01); *G06F 9/455* (2013.01); *G06F 9/45533* (2013.01); *G06F 9/45558* (2013.01); *G06F 9/48* (2013.01); *G06F 9/4806* (2013.01); *G06F 9/4843* (2013.01); *G06F 9/4881* (2013.01); *G06F 9/50* (2013.01);
(Continued)

(58) Field of Classification Search
CPC .. G06F 9/455; G06F 9/45533; G06F 9/45558; G06F 2009/45562; G06F 2009/4557; G06F 2009/45583; G06F 9/48; G06F 9/4806; G06F 9/4843; G06F 9/4856; G06F 9/4881; G06F 9/50; G06F 9/5005;
(Continued)

(56) References Cited

U.S. PATENT DOCUMENTS 9,246,840 B2 1/2016 Anderson et al.
10,812,407 B2 * 10/2020 Aronovich .............. H04L 67/10
(Continued)

FOREIGN PATENT DOCUMENTS

CN 104025055 B 6/2017

OTHER PUBLICATIONS

Hybrid Auto-Scaling for an Asynchronous Computationally Intensive Application; Arnþór Jóhann Jónsson; Stockholm, Sweden; Jun. 29, 2020 (68 pages).
(Continued)

*Primary Examiner* — Charles M Swift
(74) *Attorney, Agent, or Firm* — K&L Gates LLP

(57) ABSTRACT

Methods and systems for scaling computing processes within a serverless computing environment are provided. In one embodiment, a method is provided that includes receiving a request to execute a computing process in the serverless computing environment. A first node may be created within the serverless computing environment to execute the computing process. A first amount of computing resources may be assigned to the first node. It may be determined later that the first amount of computing resources are not sufficient to implement the first node. A second amount of computing resources may be determined with a vertical autoscaling process and a second node may be created within the serverless computing environment using a horizontal autoscaling process. The second node may be assigned the second amount of computing resources. The computing process may then be executed using both the first and second nodes within the serverless computing environment.

20 Claims, 6 Drawing Sheets

(52) U.S. Cl.
CPC .......... *G06F 9/5005* (2013.01); *G06F 9/505* (2013.01); *G06F 9/5027* (2013.01); *G06F 9/5061* (2013.01); *G06F 9/5077* (2013.01); *G06F 9/5083* (2013.01); *G06F 2009/4557* (2013.01); *G06F 2009/45562* (2013.01)

(58) Field of Classification Search
CPC ...... G06F 9/5027; G06F 9/505; G06F 9/5061; G06F 9/5077; G06F 9/5083
See application file for complete search history.

(56) References Cited

U.S. PATENT DOCUMENTS

| | | | |
|---|---|---|---|
| 2013/0174146 A1* | 7/2013 | Dasgupta | G06F 9/5077 718/1 |
| 2018/0113748 A1* | 4/2018 | Pagade | H04L 67/1095 |
| 2020/0012510 A1 | 1/2020 | Andrianov et al. | |
| 2020/0267212 A1 | 8/2020 | Chatt et al. | |
| 2020/0272526 A1* | 8/2020 | Bhole | G06F 11/3409 |
| 2021/0173719 A1* | 6/2021 | Chester | G06F 9/455 |

OTHER PUBLICATIONS

HyScale: Hybrid Scaling of Dockerized Microservices Architecture; Jonathan Paul Wong; 2018; retrieved Oct. 5, 2020; (81 pages).
Machine learning-based auto-scaling for containerized applications; Imdoukh et al; Neural Computing and Applications (2020) 32:9745-9760; Oct. 8, 2019 (16 pages).

* cited by examiner

DIAGONAL AUTOSCALING OF SERVERLESS COMPUTING PROCESSES FOR REDUCED DOWNTIME

BACKGROUND

Computing systems may rely on agile computing environments to execute one or more functions and/or to provide computing services. Agile computing environments may provide computing resources that can be used by the computing systems to execute the functions and/or computing services. In particular, the agile computing environments may allocate a portion of the computing resources (e.g., processing, storage, input/output resources) to execute requested functions and/or computing services.

SUMMARY

The present disclosure presents new and innovative systems and methods for scaling computing processes within a serverless computing environment. In one embodiment, a method is provided that includes receiving a request to execute a computing process in a serverless computing environment and creating a first node within the serverless computing environment to execute the computing process. A first amount of computing resources may be assigned to implement the first node. The method may also include determining that computing resources necessary to implement the first node exceeds the first amount of computing resources and determining, with a vertical autoscaling (VA) process, a second amount of computing resources. The method may further include creating, using a horizontal autoscaling (HA) process, a second node within the serverless computing environment to execute the computing process. The second amount of computing resources may be assigned to implement the second node. The computing process may be executed within the serverless computing environment using both the first and second nodes.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Figure 1:
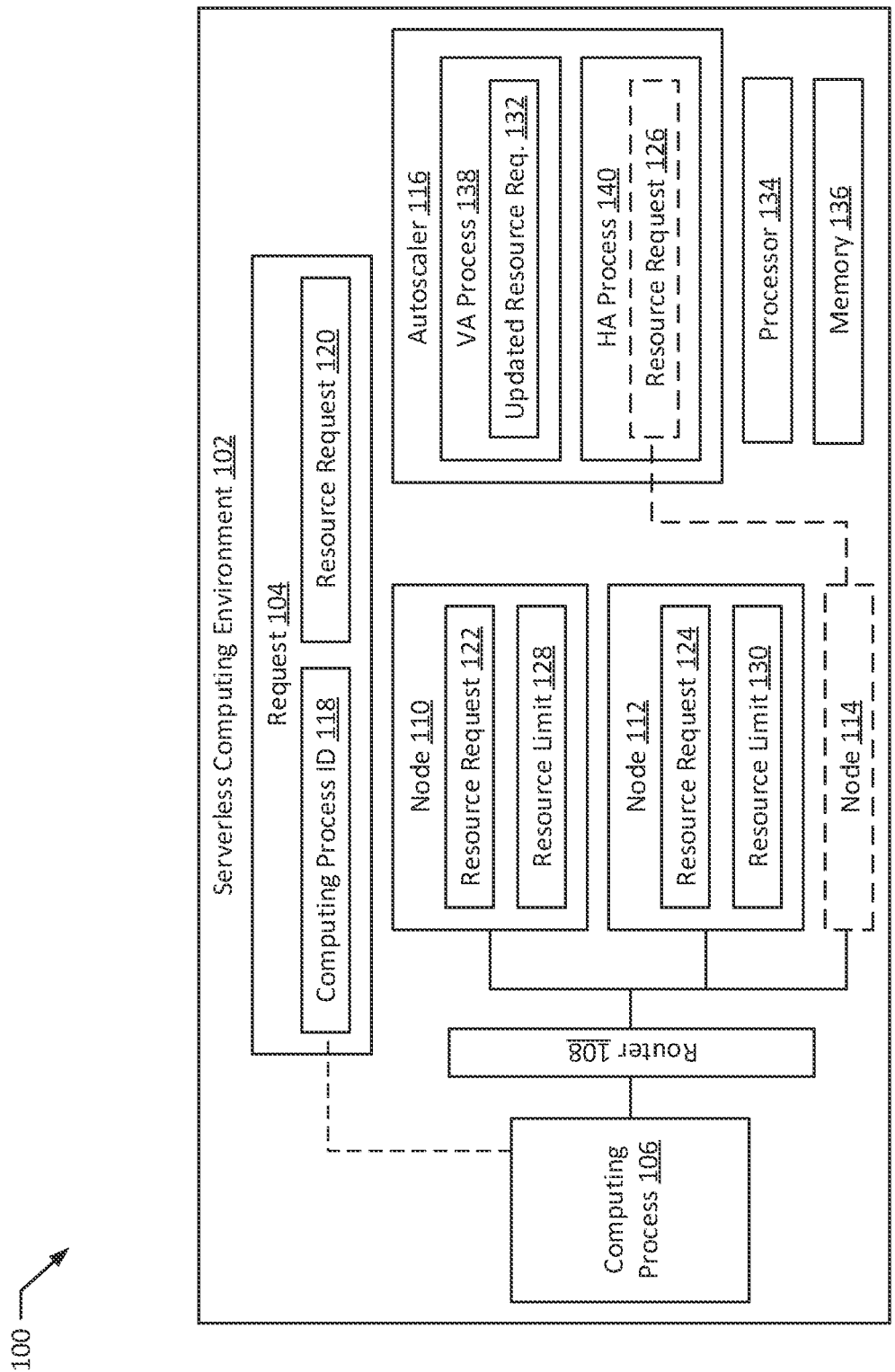
FIG. 1 illustrates a system for scaling computing processes according to an exemplary embodiment of the present disclosure.

Computing environments such as agile computing environments that provide computing resources to other computing systems (e.g., by a cloud computing infrastructure) typically include multiple computing units with associated computing resources, such as processors, memory, hard disks, and/or graphical processing units. The computing environments may provision the computing resources from among the computing units to computing systems requesting execution of functions associated with the computing systems. To allocate the computing resources, the computing environments typically rely on virtualization. Virtualizing the computing resources may abstract the specific computing unit and/or specific piece or portion of computing hardware that a requesting computing system is allocated. Virtualization may allow functions to be split up between multiple pieces of hardware (e.g., multiple processors, multiple processor cores, multiple memories). Further, the functions may also be split up between computing hardware on different computing units. Overall, virtualization may allow computing environments to increase overall resource utilization among the computing units while also reducing the complexity for requesting computing systems, which do not have to configure the specific computing resources allocated for execution of functions. However, virtualizing computing resources can reduce overall function execution speed. For example, virtualized computing resources may typically require a greater proportion of computing resources, as fewer overall computing resources of the computing units are available for function execution. In particular, virtualization of computing resources requires a certain level of computing overhead to run and support the virtualization system, which reduces the overall availability of computing hardware and increases the latency of the computing resources of the computing units.

To address the above shortcomings of virtualized computing environments, other techniques for provisioning computing resources in a computing environment include directly provisioning specific pieces or portions of the computing hardware of the computing units (e.g., "composable infrastructure"). For example, one or more cores of a processor and/or a predefined amount of memory may be allocated to execute a specific function. In such implementations, the serverless computing environment may receive functions for execution. Certain serverless functions (e.g., functions manipulating or analyzing previously-stored data) may require access to data stored on particular storage pools.

In either of these scenarios, workloads or request loads for particular applications may change over time. For example, many more requests may be received for an application, and additional computing resources may need to be allocated to the application to ensure all of the requests can be properly processed. In such instances, the cloud computing environment (e.g., a serverless computing environment) may determine a new (e.g., greater) amount of computing resources for an existing instance of the application. The additional computing resource may then be allocated to the existing instance by pausing execution of the existing instance, allocating the resources, and then resuming execution of the existing instance. Additionally or alternatively, a cloud computing environment may respond to increasing request loads by instantiating a new instance of the application. For example, a new instance of the application may be created using the same computing resources as those identified in an initial request to execute the application (e.g., received from a user).

However, these processes for increasing assigned computing resources and creating new nodes do not typically communicate with one another. This can result in new nodes being created that do not have enough assigned computing resources. Furthermore, allocating additional computing resources to a particular node may require the node to be paused or halted while the new computing resources are assigned. Accordingly, new nodes that do not have enough computing resources may often be restarted multiple times as the amount of assigned computing resources is progressively increased until it is sufficient to meet the operating needs of the computing process, known as a "warming up" process. Overall, the initialization and warm up processes can create excessive delays in deploying new nodes for a computing process that is experiencing a large number of requests. This can create increased response latency for received requests and, in certain scenarios, can cause existing nodes to be overloaded and failed. Accordingly, there exists a need to progressively scale nodes for a computing process within a serverless computing environment while avoiding the excessive restarts of typical scaling processes.

One solution to this problem is to allow vertical autoscaling (VA) processes that assign additional computing resources to existing nodes to communicate with horizontal autoscaling (HA) processes that create new nodes. In particular, when a node for a computing process determines that it needs additional resources, the node may request additional computing resources from a VA process, which may determine additional computing resources to be assigned to the node. Instead of assigning the additional computing resources to the requesting node, however, the request may be routed instead to an HA process, which may create a new node for the computing process that is assigned the additional computing resources. In this way, the initial, requesting node does not have to be restarted and can continue to process requests for the computing process. Furthermore, the new node is created with an increased amount of computing resources, as determined by the VA process, that is determined based on corresponds to the current usage rate of the computing process. This differs from conventional VA processes, which can typically only increase the resource allocation of existing nodes and must restart the nodes to do so, and differs from conventional HA processes, which can typically only create new nodes based on an existing resource profile. Furthermore, a router for the computing process may be provided to route requests between multiple nodes for the computing process. This router may be assigned weights for the nodes that are determined based on the relative amounts of computing resources assigned to each node. The router may then route requests for the computing process in proportion to the assigned weights. This may help ensure that the requests are evenly distributed across the computing resources assigned to the nodes executing the computing process.

FIG. 1 illustrates a system 100 for scaling computing processes according to an exemplary embodiment of the present disclosure. The system 100 includes a serverless computing environment 102 and may be configured to scale computing processes 106 executing within the serverless computing environment 102. The serverless computing environment 102 may be configured to execute computing processes 106 on behalf of other users or other computing devices. For example, the serverless computing environment 102 may execute as all or part of a cloud computing environment.

The serverless computing environment 102 may execute computing processes 106 based on requests 104 received from other computing devices and/or other users (e.g., customers of a cloud computing environment). The requests 104 may identify the computing process to be executed and an amount of computing resources to be used to execute the computing process. In particular, the request 104 may include a computing process ID 118, which may correspond to the computing process 106 (e.g., may identify the computing process 106 within a database of computing processes 106 for execution within the serverless computing environment 102). The request 104 may also include a resource request 120, which may specify an amount of computing resources (e.g., an amount of memory, a number of CPU cores, a number of CPU core cycles required, a number of GPU cores, a number of GPU cores required) to be used in executing the computing process 106 (e.g., an initial instance of the application).

In response to receiving the request 104, the serverless computing environment 102 may instantiate one or more nodes 110, 112 to execute the computing process 106. As used herein, "nodes" may refer to any type of computing unit that may contain or orchestrate the execution of computing processes within a serverless computing environment. For example, the nodes may be allocated portions of discrete computing hardware (e.g., specific portions of a computing memory, specific cores or a percentage of execution cycles for a CPU/GPU). In certain instances, the nodes may be implemented at least in part based on pods or services, such as kubernetes pods or services. For example, in response to first receiving the request 104, the serverless computing environment 102 may create a first node 110 to execute the computing process 106 and may allocated a first amount of computing resources to the first node 110 (e.g., a first amount of memory, a first amount of CPU). As used herein, "amount(s) of computing resources" may refer to a total capacity of one or computing resources, such as memory resources, storage resources, and/or processing resources. For example, an amount of computing resources may include one or more of a capacity of memory (e.g., 200 MB, 500 MB, 1 GB of memory), an amount of storage capacity (e.g., 1 GB, 10 GB, 100 GB, 1 TB), a number of CPU cores (e.g., 1 core, 2 cores, 4 cores), a number/rate of CPU cycles (e.g., 200 MHz, 500 MHz), a number of GPU cores (e.g., 1 core, 2 cores, 4 cores), and/or a number/rate of GPU cycles (e.g., 200 MHz, 500 MHz). In light of the present disclosure, additional types of computing resources may be readily apparent to one skilled in the art. All such computing resources are considered within the scope of the present disclosure.

Later, as explained further below, the serverless computing environment 102 may create a second node 112 (e.g., to handle a higher request load for the computing process 106). The nodes 110, 112 may contain a resource request 122 and a resource limit 128. The resource request 122 may indicate the initial amount of computing resources allocated to the nodes 110, 112. For example, the node 110 created in response to initially receiving the request 104 may be allocated the amount of resources in the resource request 120, and the resource request 122 may indicate the same amount of computing resources as the resource request 120. As explained further below, when created, the node 112 may be assigned a different amount of computing resources than the node 110 (e.g., may be assigned a greater amount of computing resources). Accordingly, the resource request 124 may be different than the resource request 120. The resource limits 128, 130 may indicate a maximum amount of computing resources used by a particular node executing the computing process 106. The resource limits 128, 130 may be the same for each node 110, 112 of a computing process and may act to limit the maximum number of computing resources that can be allocated to the nodes 110, 112. In certain implementations, the resource limits 128, 130 may be the same for all nodes 110, 112 of a computing process 106. In additional or alternative implementations, the resource limits 128, 130 may increase as the amount of computing resources assigned to nodes increases. For example, the resource limits 128, 130 may increase in proportion with the increase in resource requests 122, 124. In certain implementations, the resource limits 128, 130 may be received in the request 120. Additionally or alternatively, the resource limits 128, 130 may be generated based on the computing process 106 and/or operating conditions within the serverless computing environment. For example, the resource limit 128, 130 may be higher for computing processes 106 that have received high request loads in the past (e.g., based on historical usage data stored in association with the computing process 106). As another example, the resource limit may be lower when the serverless computing environment 102 has relatively low levels of computing resources available (e.g., when more than 80% of any particular computing resource has been allocated). In additional or alternative implementations, the resource limits 128, 130 may be assigned based on default limits associated with the serverless computing environment 102.

The serverless computing environment 102 also includes a router 108, which may be configured to route requests to execute the computing process 106 between the nodes 110, 112 implementing the computing process 106. As explained further below, the router 108 may be configured to route requests (which differ from the request 104) between the nodes 110, 112 based on a relative amount of computing resources assigned to each of the nodes. For example, the second node 112 may be assigned a larger amount of computing resources than the first node 110. Accordingly, the router 108 may route a greater proportion of the requests for the computing process 106 to the node 112 than to the node 110. For example, the computing process 106 may be created to create a record in a database (e.g., in response to receiving an order from a customer). The router 108 may receive requests (e.g., from customers upon completing the orders) containing the data to be added and the requests may be routed to one of the nodes 110, 112 to create and add the record to the database.

In certain instances, the serverless computing environment 102 may determine that an additional node is needed to execute the computing process 106. For example, the serverless computing environment 102 may determine that a number requests received by one or both of the nodes 110, 112 may be more requests than the nodes 110, 112. The serverless computing environment 102 may determine that an additional node is needed based on a percentage of assigned computing resources used by the nodes 110, 112 exceeding a predetermined threshold (e.g., 80%, 95%). Additionally or alternatively, the serverless computing environment 102 is needed based on a response latency for one or both of the nodes 110, 112 exceeding a predetermined threshold (e.g., 10 ms, 50 ms, 100 ms, 1 s). In additional or alternative implementations, one or both of the nodes 110, 112 may transmit a request that additional computing resources be assigned to the nodes 110, 112. For example, the node 112 may be assigned to request more computing resources be assigned (up to the resource limit 130) based on one or more conditions (e.g., a percentage of used computing resources exceeding a predetermined threshold, a response latency exceeding a predetermined threshold).

In such instances, the autoscaler 116 may be used to determine an amount of computing resources to be assigned to a new node 114 for the computing process 106. For example, the autoscaler 116 may receive requests from the nodes 110, 112 and/or the serverless computing environment 102 for additional computing resources and/or an additional node. The autoscaler 116 may be implemented as a software application or software process executing within the serverless computing environment 102. For example, the autoscaler 116 may be implemented within a node of the serverless computing environment. Additionally or alternatively, the autoscaler 116 may be executing within an orchestrator service configured to control operation of the serverless computing environment 102.

The autoscaler 116 includes a vertical autoscaling (VA) process 138 and a horizontal autoscaling (HA) process 140. The VA process 138 may include any computing process configured to determine an increased amount of computing resources to allocate to existing nodes of a computing process 106 within a serverless computing environment. For example, the VA process 138 may be configured to determine an increased amount of computing resources to assign to the nodes 110, 112 in response to receiving a request to "scale" the nodes (e.g., from the nodes 110, 112, and/or the serverless computing environment 102). The HA process 140 may include any computing process configured to create a new node 114 for a computing process.

Upon receiving a request from a node 110, 112 and/or the serverless computing environment 102, the autoscaler 116 may be configured to use both the VA process 138 and the HA process 140 to create a new node 114 of the computing process. For example, the autoscaler may receive a request for a new node that includes the resource request 124 and the resource limit 130 of the most recently created node 112. The resource request 124 and the resource limit 130 may be provided to the VA process 138, which may determine an updated resource request 132. In certain implementations, the updated resource request 132 may be determined based on a total amount of computing resources allocated to previously created nodes 110, 112 of the computing process 106. In further implementations, the updated resource request 132 may be determined based on a current or average computing resource utilization (e.g., memory utilization, processor utilization) by previously created nodes 110, 112 of the computing process 106. For example, the updated resource request 132 may be determined based on the total amount of memory and CPU utilization and the total number of requests received for the computing process 106 (which may be received from the router 108 and/or the nodes 110, 112). Additionally or alternatively, the updated resource request 132 may be determined at least in part based on an increase in the request load for the computing process 106 (e.g., based on a percentage increase of request load).

Conventional autoscalers may then may then be configured to use the updated resource request from a VA process to assign additional computing resources to one of the nodes 110, 112. When the amount of computing resources assigned to a node 110, 112 is greater than or equal to a resource limit 128, 130, a new node may be created using an HA process. In particular, a conventional HA process may typically be configured to create a new node based on the resource request 120 included in the initial request 104 to begin executing the computing process 106.

Instead of assigning the updated resource request 132 to one of the existing nodes 110, 112, however, the autoscaler 116 may be configured to intercept the updated resource request 132 and to provide the updated resource request 132 instead to the HA process 140. The updated resource request 132 may then be used to create the new node 114 for the computing process 106. In particular, the HA process may create a resource request 126 for the node 114 that includes the same amount of computing resources as the updated resource request 132. The HA process 140 and/or the serverless computing environment 102 may then create the new node 114 for the computing process 106. For example, the HA process 140 may transmit a request to the serverless computing environment 102 to create a new node 114 and assign the amount of computing resources indicated in the resource request 126 to the new node 114.

Once created and initialized, the node 114 may then be used to process requests for the computing process 106. In particular, after the new node 114 is created, the router 108 may be updated to include an address and a weight for the node 114. In particular, the relative weights for each of the nodes 110, 112, 114 may be updated based on the relative amount of computing resources assigned to each of the nodes 110, 112, 114. For example, the weights may be calculated based on one or more of a total capacity of memory assigned to the nodes 110, 112, 114, a total amount of storage capacity assigned to the nodes 110, 112, 114, a total number of CPU cores assigned to the nodes 110, 112, 114, a total number/rate of CPU cycles assigned to the nodes 110, 112, 114, a total number of GPU cores assigned to the nodes 110, 112, 114, and/or a total number/rate of GPU cycles assigned to the nodes 110, 112, 114. The router 108 may then route subsequent requests for the computing process 106 proportionally between the nodes 110, 112, 114 based on the weights.

The serverless computing environment 102 also contains a processor 134 and a memory 136. The processor 134 and the memory 136 may implement one or more aspects of the serverless computing environment 102, such as the nodes 110, 112, 114, the router 108, the computing process 106, and the autoscaler 116. For example, portions of the processor 134 and the memory may be assigned to the nodes 110, 112, 114 to implement the computing process 106. Additionally or alternatively, the memory 136 may store instructions which, when executed by the processor 134, cause the processor 134 to implement one or more aspects of the serverless computing environment 102, such as the nodes 110, 112, 114, the router 108, the computing process 106, and the autoscaler 116. Additionally, in practice, the serverless computing environment 102 may be implemented by multiple computing devices and may therefore contain multiple processors 134 and multiple memories 136. In such instances, the processors 134 and memories 136 may be similarly configured and assigned.

Figure 2:
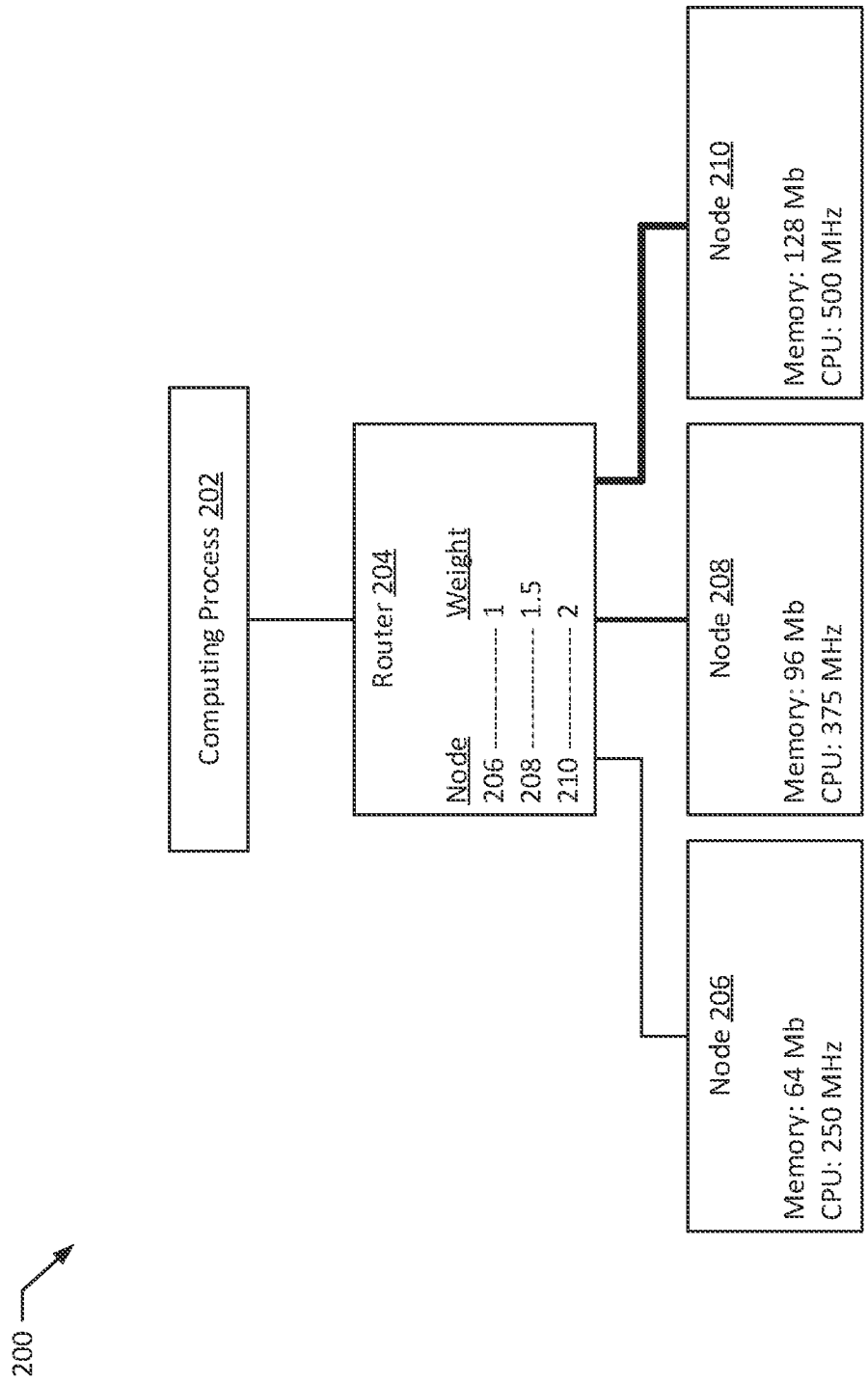
FIG. 2 illustrates a scaling scenario for a scaled computing process according to an exemplary embodiment of the present disclosure.

FIG. 2 illustrates a scaling scenario 200 for a scaled computing process 202 according to an exemplary embodiment of the present disclosure. The scaling scenario 200 includes the computing process 202, which may be implemented by the nodes 206, 208, 210. The nodes 206, 208, 210 may be implemented similar to the nodes 110, 112, 114 discussed above and may be assigned different amounts of computing resources for use in responding to requests for the computing process 202. For example, each of the nodes 206, 208, 210 includes an assigned memory capacity (64 Mb for the node 206, 96 Mb for the node 208, and 128 Mb for the node 210) and an assigned processor capacity (250 MHz for the node 206, 375 MHz for the node 208, and 500 MHz for the node 210). The computing resources may be assigned by an autoscaler, similar to the autoscaler 116, that is configured to combine both a VA process and an HA process to progressively increase the amount of computing resources assigned to later-created nodes of a computing process (e.g., in conjunction with an increase in requests for the computing process 202).

The scenario 200 also includes a router 204, which may be configured to route requests for the computing process 202 between the nodes 206, 208, 210 for processing. For example, the computing process 202 may be performed to send an email (e.g., an order confirmation email) to customers after completing an order on an ecommerce platform. Requests may be received from the ecommerce platform whenever an order is completed, and the router 204 may route the requests to the nodes 206, 208, 210, which may create and send the order confirmation email.

The router 204 stores weights associated with each of the nodes 206, 208, 210. The weights may be calculated based on the computing resources assigned to each of the nodes 206, 208, 210. For example, the node 208 has 1.5× as much memory capacity and processor capacity assigned as the node 206 and the node 210 has 2× the memory capacity and processor capacity as the node 206. Accordingly, the weights may be proportionally assigned such that the node 206 has a weight of 1, the node 208 has a weight of 1.5, and the node 210 has a weight of 2.

These weights may be calculated based on a proportion of the total memory capacity and a total processing capacity assigned to all nodes of the computing process. In the depicted example, the memory and processing capacities assigned to the nodes scaled proportional to one another, but this may not always be the case. To account for such scenarios, the relative amounts of memory capacity and processing capacity may have different impacts on the overall weights for the nodes 206, 208, 210. In one specific example, the node 210 may be assigned 375 MHz of processing capacity, similar to the processing capacity assigned to the node 208, instead of 500 MHz as depicted. Furthermore, the router 204 may assign weights based 40% on the relative processing capacity and 60% based on the relative memory capacity. The total memory capacity assigned to all three nodes 206, 208, 210 is 64 Mb+96 Mb+128 Mb=288 Mb. The total processing capacity assigned to all three nodes 206, 208, 210 is 250 MHz+375 MHz+375 MHz=1,000 MHz. The weight assigned to the node 206 may be 0.6*(64 Mb/288 Mb)+0.4*(250 MHz/1,000 MHz)=0.2333. Weights for nodes 208, 210 may be similarly calculated as 0.34 and 0.4167, respectively. The weights may, in certain instances, be normalized such that the smallest weight is 1. In such instances, the weights for nodes 206, 208, 210 may respectively be 1, 1.5, 1.786. As another example, the weights may be assigned based on a number of requests per second successfully handled by each node. For instance, certain nodes may be co-located (e.g., executing on the same computing device, or a nearby computing device) with other computing processes of the serverless computing environment, which may allow the nodes to process more requests with fewer computing resources (e.g., because communication is faster). Accordingly, certain formulations may incorporate request processing rates and/or predicted request processing rates into weights for the nodes. Furthermore, in certain implementations, the weights for the router 204 may be updated over time (e.g., based on recent request processing rates for the nodes 206, 208, 210), even when a new node has not been added to the serverless computing environment. It should be understood that the above example was merely exemplary and that, in practice, various strategies for determining the weights based on assigned computing resource capacities may be used and many such strategies may be readily apparent to one skilled in the art in light of the present disclosure. All such strategies are considered within the scope of the present disclosure.

Figure 3:
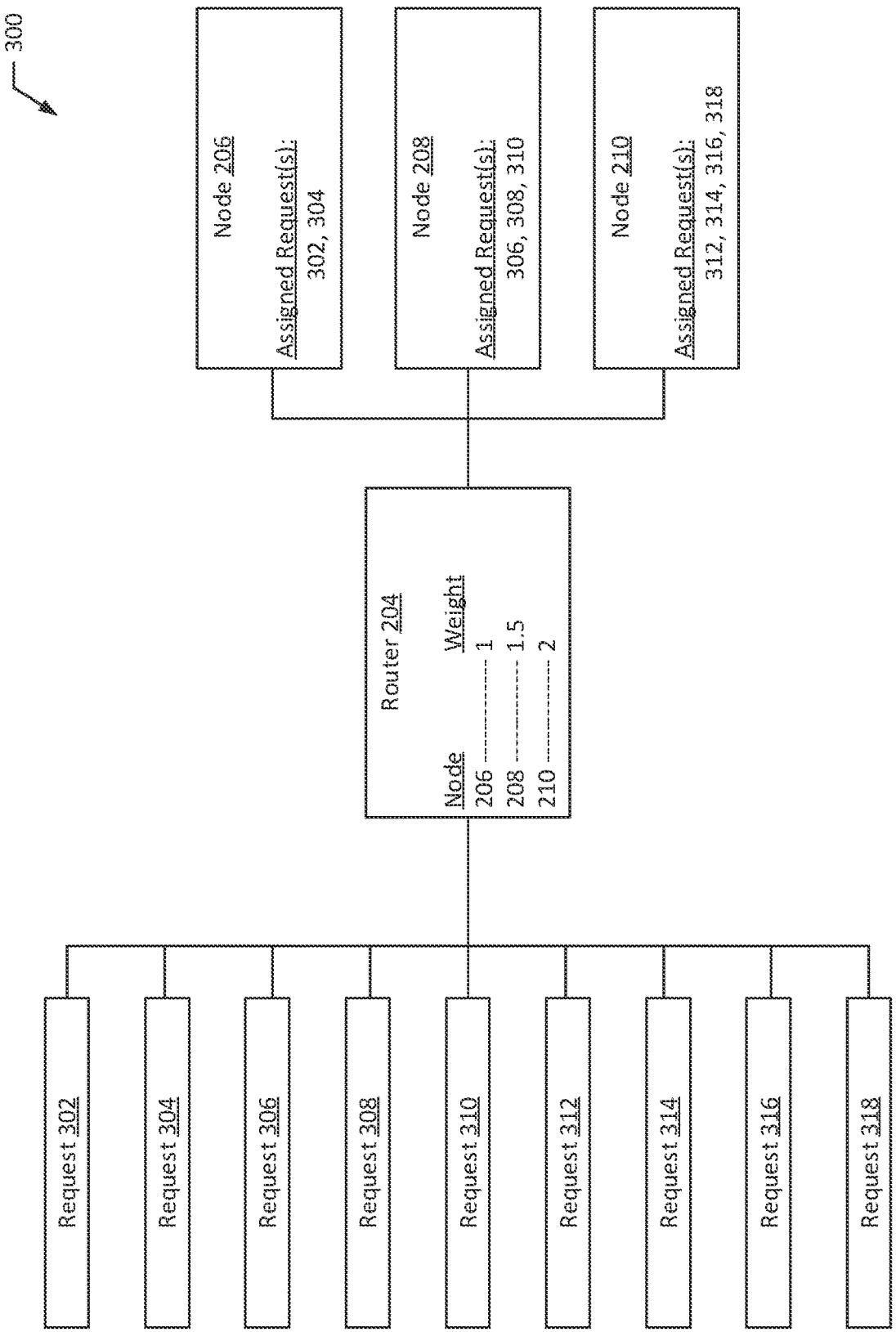
FIG. 3 illustrates a routing scenario for a scaled computing process according to an exemplary embodiment of the present disclosure.

Returning to FIG. 2, as explained above, the router 204 may route requests for the computing process 202 based on the relative magnitudes of the weights 1, 1.5, 2 associated with each of the nodes 206 (e.g., as indicated by the relative line widths between the router 204 and the nodes 206, 208, 210). In particular, based on the weights depicted in the scenario 200, the router may route roughly 22% of received requests to the node 206, 33% of received requests to the node 208, and 45% of received requests to the node 210. In particular, FIG. 3 illustrates one such routing scenario 300 for the computing process 202 according to an exemplary embodiment of the present disclosure. In the scenario 300, the router 204 receives 9 requests 302, 304, 306, 308, 310, 312, 314, 316, 318 over a particular period of time (e.g., 10 ms, 100 ms, 1 s). Based on the relative weights for each of the nodes 206, 208, 210, the router routes 22% of the requests (e.g., two requests 302, 304) to the node 206, 33% of the requests (e.g., three requests 306, 308, 310) to the node 208, and 45% of the requests (e.g., 4 requests 312, 314, 316, 318) to the node 210.

In certain instances, the router 204 may assign incoming requests 302, 304, 306, 308, 310, 312, 314, 316, 318 randomly based on the weights. For example, the router 204 may randomly generate a number between 0 and 1 for each incoming request 302, 304, 306, 308, 310, 312, 314, 316, 318 and may assign requests 302, 304 to the node 206 when the randomly generated number is between or including 0 and 0.22, may assign a requests 306, 308, 310 to the node 208 when the randomly generated number is greater than 0.22 and less than or equal to 0.55, and may assign requests 312, 314, 316, 318 to the node 210 and the randomly generated number is greater than 0.55. It should be understood, however, that the above example is merely exemplary. In light of the present disclosure, multiple strategies may be readily apparent to one skilled in the art for routing received requests between the nodes 206, 208, 210 based on the weights of the nodes stored within the router 204. All such strategies are considered within the scope of the present disclosure.

In this manner, serverless computing environments may be able to more efficiently scale nodes assigned to implement a computing process while also ensuring that nodes assign greater computing resources are also assigned to process a greater proportion of incoming requests for the computing process. Such implementations may reduce or stabilize response latency for received requests, as proportional processing of received requests based on the allocated computing resources ensures that roughly the same amount of computing resources are used to process each request. This may improve reliability for the computing process by reducing the frequency with which nodes that are allocated fewer computing resources cause bottlenecks in processing responses for computing processes. Furthermore, these techniques may improve overall resource utilization, as nodes that have been assigned a greater number of computing resources are in fact assigned to process a correspondingly larger proportion of the received requests.

Figure 4:
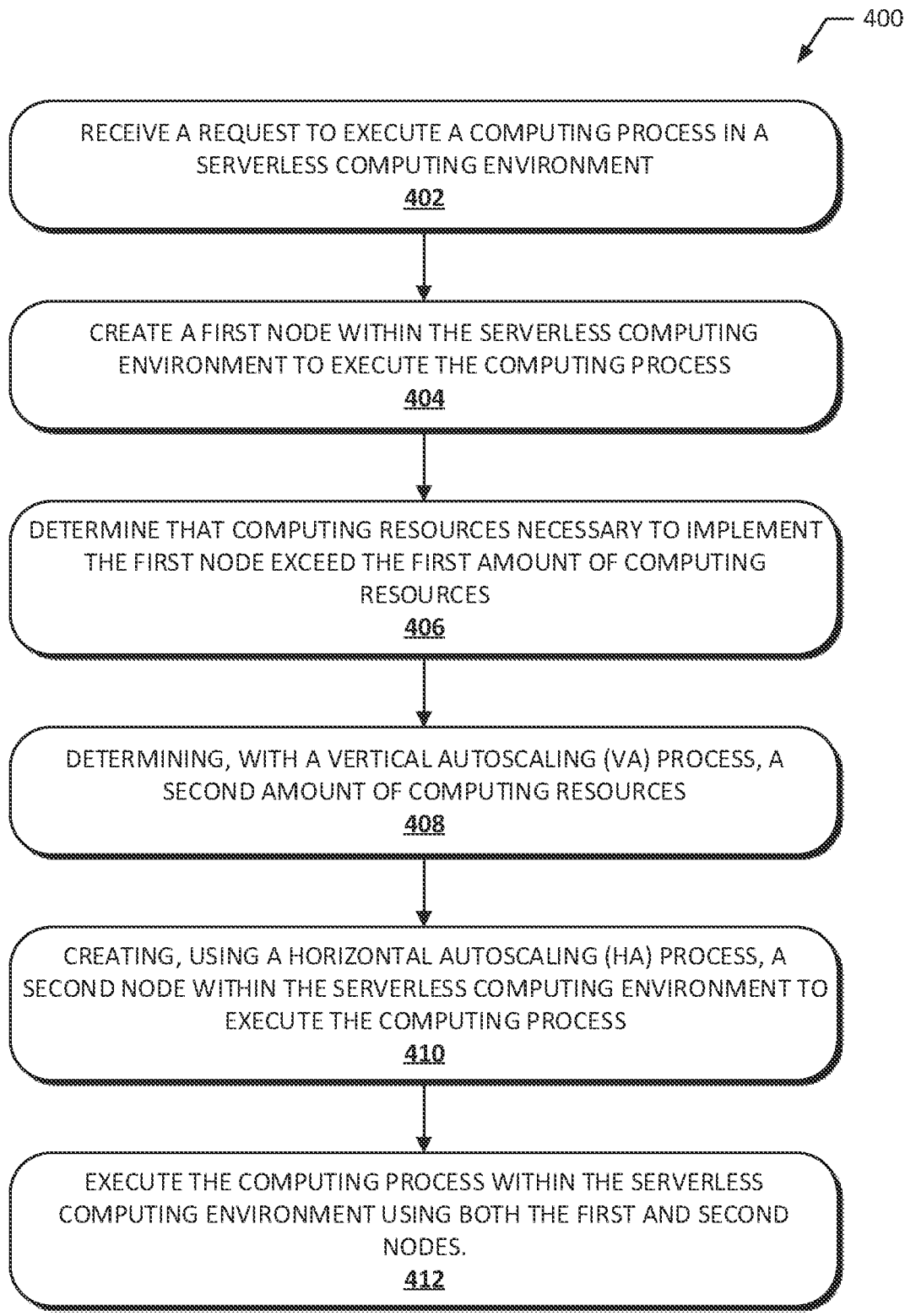
FIG. 4 illustrates a method for scaling a computing process according to an exemplary embodiment of the present disclosure.

FIG. 4 illustrates a method 400 for scaling a computing process according to an exemplary embodiment of the present disclosure. In particular, the method 400 may be performed to scale a computing process 106, 202 within a serverless computing environment 102 by adding a new node to implement the computing process 106, 202 (e.g., to respond to requests for the computing process 106, 202). The method 400 may be implemented on a computer system, such as the system 100. For example, the method 400 may be implemented by the serverless computing environment 102. The method 400 may also be implemented by a set of instructions stored on a computer readable medium that, when executed by a processor, cause the computer system to perform the method 400. For example, all or part of the method 400 may be implemented by the processor 134 and the memory 136. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with receiving a request to execute a computing process in a serverless computing environment (block 402). For example, the serverless computing environment 102 may receive a request 104 to execute a computing process 106, 202. The request 104 may identify the computing process 106, 202 with a corresponding computing process ID 118. For example, the computing process ID 118 may identify the computing process 106, 202 within a database storing multiple computing processes that can be executed by the serverless computing environment 102. The request 104 may also identify a resource request 120, which may specify an amount of computing resources to use when executing the computing process 106, 202 (e.g., for nodes configured to execute the computing process 106, 202). For example, the resource request 120 may specify a minimum amount of computing resources and/or a maximum limit of computing resources to be used for nodes implementing the computing process 106, 202.

A first node may be created within the serverless computing environments to execute the computing process (block 404). For example, a first node 110, 206 may be created within the serverless computing environment 102 to execute the computing process 106, 202. The node 110, 206 may be assigned a first amount of computing resources. The first amount of computing resources may specify, e.g., a memory capacity and/or a processing capacity for use by the node 110, 206. The first amount of computing resources may be assigned as a resource request 122 of the node 110, 206. The resource request 122 may be determined based on the resource request 120 specified within the request 104. For example, the node 110 may be assigned a resource request 122 corresponding to a minimum amount of computing resources identified in the resource request 120 of the request 104. As another example, the node 206 may be assigned 64 Mb of memory capacity and 250 MHz of processing capacity, which may be specified in an initial request to execute the computing process 202. In additional or alternative implementations, the request 104 may not specify a resource request 120. In such instances, a database storing the computing process 106, 202 may include a corresponding resource request 120 for the computing process 106, 202, may similarly be used to determine the first amount of computing resources assigned to the first node 110, 206.

It may be determined that computing resources necessary to implement the first node exceed the first amount of computing resources (block 406). For example, the node 110, 206 and/or the serverless computing environment 102 may determine that computing resources necessary to implement the node 110, 206 exceed the first amount of computing resources. As one specific example, the node 110, 206 and/or the serverless computing environment 102 may determine that amount of computing resources specified by the resource request 122 are not sufficient to respond to a number of requests for the computing process 106, 202. For example, the node 110, 206 and/or the serverless computing environment 102 may analyze overall resource utilization by the nodes 110, 206 implementing the computing process 106, 202 to determine whether a total resource utilization exceeds a predetermined threshold (e.g., 75%, 80%, 90%) for a predetermined period of time (e.g., 250 ms, 500 ms, 1 s). In such instances, it may be determined that computing resources necessary to implement the first node exceed the first amount of computing resources. As another example, the node 110, 206 and/or the serverless computing environment may analyze request response or request completion latencies for the computing process 106, 202. In response to determining that request response or request completion latencies exceed a predetermined threshold (e.g., 70 ms, 250 ms, 1 s) for a predetermined period of time (e.g., 250 ms, 500 ms, 1 s), it may be determined that the computing resources necessary to implement the first node exceed the first amount of computing resources. In certain implementations, one or more of the above-discussed predetermined thresholds and/or predetermined periods of time may be determined based on the computing process 106, 202. For example, a database storing the computing process 106, 202 may also store corresponding predetermined thresholds and/or predetermined periods of time for use by the serverless computing environment 102.

A second amount of computing resources may be determined with a VA process (block 408). For example, a VA process 138 of the serverless computing environment 102 may determine a second amount of computing resources. The VA process 138 may be part of an autoscaler 116 of the serverless computing environment 102. As explained above, the VA process 138 may determine an updated resource request 132 identifying the second amount of computing resources. The updated resource request 132 and the second amount of computing resources may be determined as an increased amount of computing resources to be allocated to the first node 110, 206. For example, the updated resource request 132 may be determined based on a current number of requests received for the computing process 106, 202 and the current amount of computing resources assigned to the first node (e.g., the first amount of computing resources).

A second node to execute the computing process may be created within the serverless computing environment using an HA process (block 410). For example, an HA process 140 may be used to create a second node 114, 208 within the serverless computing environment 102 to execute the computing process 106, 202. For the purposes of the ongoing discussion of the method 400, references to reference numerals of FIG. 1 will assume that the node 112 was not created and that the node 114 represents the second node to be created for the computing process 106. These discussions should not be considered limiting on the previously discussed elements of FIG. 1, or any other portion of the present disclosure. The HA process 140 may be part of an autoscaler 116 of the serverless computing environment 102. As explained above, rather than using the updated resource request 132 to increase the computing resources assigned to the first node 110, 206, the autoscaler 116 may instead intercept and provide the updated resource request to the HA process 140 for use in creating the second node 114, 208. In particular, the HA process 140 may create a resource request 126 for a new node 114, 208 and may provide the resource request 126 to the serverless computing environment 102. In response, the serverless computing environment 102 may create the second node 114, 208 and may allocate the second amount of computing resources (identified within the resource request 126) to the second node 114, 208. In certain implementations, creating the second node 114, 208 may not change the amount of computing resources allocated to the first node 110, 206. In particular, after creating the second node 114, 208, the first amount of computing resources may still be allocated to the first node 110, 206.

In certain implementations, creating the second node may further include updating a router 108, 204 associated with the computing process 106, 202 with new weights for the first node 110, 206 and the second node 114, 208. For example, the autoscaler 116 and/or the router 108, 204 may calculate a new weights for each of the nodes 110, 114, 206, 208 created to execute the computing process 106, 202. In particular, as explained above, the weights may be calculated based on the first and second amounts of computing resources assigned to the nodes, using one or more of the techniques discussed above. In certain implementations, the router may be updated at the same time as (e.g., in parallel with) the second node is created.

The computing process may be executed within the serverless computing environment using both the first and second nodes (block 412). For example, the computing process 106 may be executed within the serverless computing environment 102 using both the first node 110, 206 and the second node 114, 208. To execute the computing process, the serverless computing environment 102 may route requests for the computing process 106, 202 between the nodes 110, 114, 206, 208 using a router 108, 204. As explained above, the router 108, 204 may contain weights determined based on the relative proportions of computing resources allocated to each of the nodes 110, 114, 206, 208 created to execute the computing process 106, 202. The router 108, 204 may accordingly route requests for the computing process 106, 202 proportionally based on the first and second amount of computing resources between the first and second nodes 110, 114, 206, 208, e.g., proportionally based on the relative magnitudes of weights associated with the first node 110, 206 and the second node 114, 208.

All or part of the method 400 may be repeated to add additional nodes to the computing process 106, 202. For example, blocks 406-412 may be repeated to determine that the first and second amounts of computing resources are not sufficient to implement the first and second nodes and to determine a third amount of computing resources and create a third node 210 to execute the computing process 106, 202. Over time, a request load for the computing process 106, 202 may reduce as well. In such instances, one or more of the nodes 110, 114, 206, 208 may be terminated or may have their assigned computing resource reduced. As one example, when a request load drops below a predetermined threshold (e.g., 70% of recent peak usage, 50% of recent peak usage) or when computing resource utilization drops below a predetermined threshold, the autoscaler 116 may terminate one of the nodes 110, 114, 206, 208. The node for termination may be selected based on the weights. For example, if a request load for the computing process 106, 202 drops by 20%, one or more nodes may be selected for termination that total up to approximately 20% (e.g.,+/−1%, +/−5%, +/−10%) of the total weights for all nodes 110, 114, 206, 208 of the computing process 106, 202. The selected nodes may then be halted (e.g., by terminating execution, pausing execution, removing an assignment of computing resources).

In this manner, new computing resources may be assigned to a serverless computing environment in order to implement a computing process without having to halt execution of any of the nodes previously created to execute the computing process. In particular, the method 400 avoids the multiple restarts of nodes when scaled using a vertical autoscaling process. Furthermore, by enabling communication between vertical and horizontal autoscaling processes the method 400 avoids creating new nodes for a computing process using a horizontal autoscaling process that will quickly require additional computing resources to be assigned using a vertical autoscaling process, which requires even more node restarts. Accordingly, the method 400 may improve overall node uptime for nodes created to execute the computing process by reducing restarts and may improve request latency, as newly-created nodes are assigned computing resources based on the current operating conditions for the computing process, as indicated by the updated resource request from the vertical autoscaling process.

Figure 5:
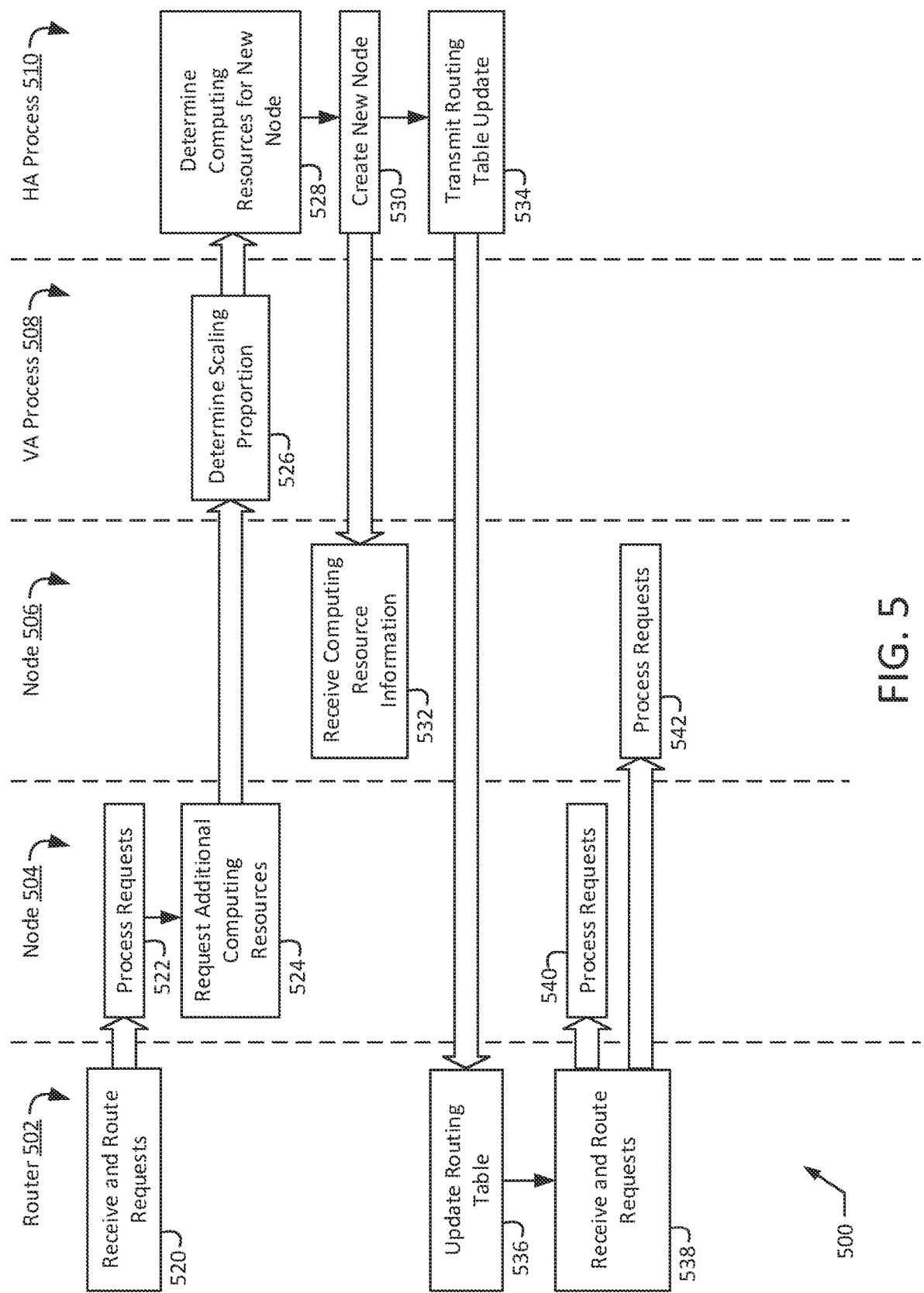
FIG. 5 illustrates a flow diagram of a method for scaling a computing process according to an exemplary embodiment of the present disclosure.

FIG. 5 illustrates a flow diagram of a method 500 for scaling a computing process according to an exemplary embodiment of the present disclosure. The method 500 may be performed by a serverless computing environment, such as the serverless computing environment 102. In particular, the flow diagram includes a router 502, which may be analogous to the router 108, a node 504, which may be analogous to the nodes 110, 112, a node 506, which may be analogous to the node 114, a VA process 508, which may be analogous to the VA process 138, and HA process 510, which may be analogous to the HA process 140. The method 500 may also be implemented by a set of instructions stored on a computer readable medium that, when executed by a processor, cause the computer system to perform the method 500. For example, all or part of the method 500 may be implemented by a processor and a memory of the serverless computing environment, such as the processor 134 and the memory 136. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 may begin with the router 502 receiving and routing requests for a computing process (block 520). One or more nodes 504 assigned to execute the computing process may have been previously created within the serverless computing environment, and the router 502 may be configured to route requests between the one or more nodes. The router 502 may route requests to the node 504. The node 504 may process the requests by executing the computing process (block 522). Eventually, the node 504 may determine that the computing resources assigned to the node 504 not sufficient to respond to the number of requests received for the computing process (e.g., based on resource utilization, response latency, as discussed above). In response, the node 504 may request additional computing resources from the VA process 508 (block 524). In particular, the node 504 may request that additional computing resources be assigned to the node 504 by the VA process 508.

In response to receiving the request from the node 504, the VA process 508 may determine a scaling proportion for the computing resources assigned to the node 504 (block 526). For example, the scaling proportion may be a multiplier (e.g., greater than 1) for one or more computing resources assigned to the node 504 (e.g., processing resources, memory resources). In a conventional implementation, this scaling proportion may then be used by the serverless computing environment to determine an increased amount of computing resources to assigned the node 504. Instead however, an autoscaler of the serverless computing environment may intercept the scaling proportion and route the scaling proportion to the HA process 510. The HA process 510 may determine computing resources for a new node based on the scaling proportion (block 528). For example, the HA process 510 may multiply the scaling proportion(s) for each of the computing resources assigned to the node 504 to determine an amount of computing resources for the new node 506.

The HA process 510 may create the new node 506 (block 530). The HA process 510 may request that the serverless computing environment 102 create a new node and may provide the computing resources to be assigned to the node 506 upon creation. The node 506 may receive the computing resource information (block 532). The computing resource information may identify the computing resources for the new node 506, and the new node 506 may request the computing resources from the serverless computing environment 102, which may assign the computing resources to the new node 506. The HA process 510 may also transmit a routing table update to the router 502 (block 534). The routing table updates may include weights corresponding to each of the nodes 504, 506 assigned to execute the computing process. In particular, the weights may be determined based on the relative amounts of computing resources assigned to each of the nodes 504, 506, as discussed above. The router 502 may receive the routing table updates in may update the routing table (block 536). Once updated, the router 502 may receive and route requests according to the updated weights of the nodes 504, 506 (block 538). In particular, received requests may now be routed to both nodes 504, 506 for processing (blocks 540, 542).

In this manner, new nodes may be added to the serverless computing environment based on both horizontal and vertical autoscaling processes. Furthermore, the routing table may be kept updated such that requests for the computing process continue to be processed by nodes within the serverless computing environment in proportion to assigned computing resources for the nodes. Furthermore, although not depicted, in certain implementations, additional requests may be received while the new node 506 is being created. In such implementations, the original node(s) may continue to process requests while the new node is created.

Figure 6:
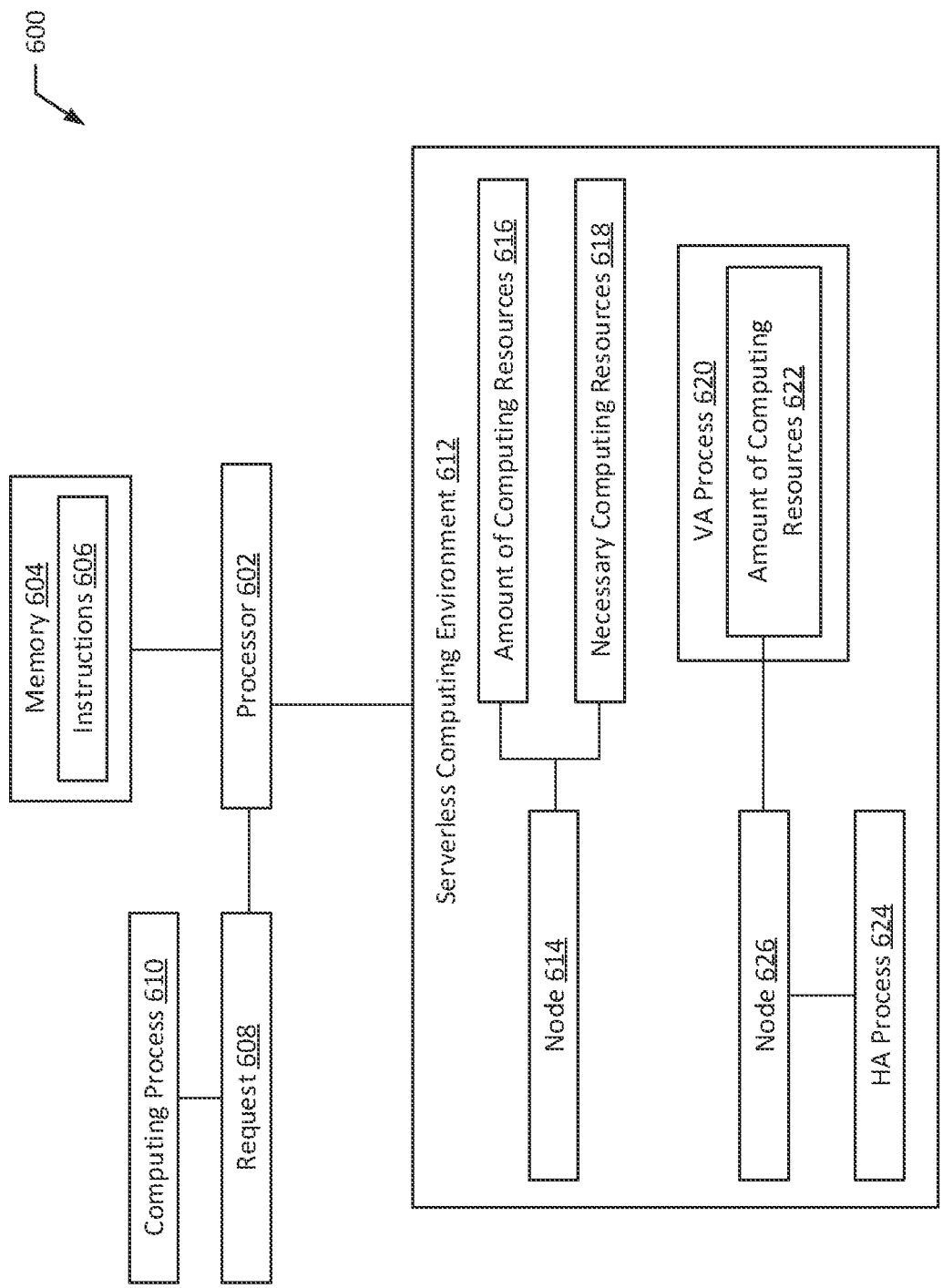
FIG. 6 illustrates a system according to an exemplary embodiment of the present disclosure.

FIG. 6 illustrates a system 600 according to an exemplary embodiment of the present disclosure. The system 600 includes a processor 602 and a memory 604. The memory 604 stores instructions 606 which, when executed by the processor 602, cause the processor to receive a request 608 to execute a computing process 610 in a serverless computing environment 612. The instructions 606 may further cause the processor 602 to create a first node 614 within the serverless computing environment 612 to execute the computing process 610. A first amount of computing resources 616 are assigned to implement the first node 614. The instructions 606 may further cause the processor 602 to determine that necessary computing resources 618 to implement the first node 614 exceed the first amount of computing resources 616 and determine, with a vertical autoscaling (VA) process 620, a second amount of computing resources 622. The instructions may also cause the processor to create, using a horizontal autoscaling (HA) process 624, a second node 626 within the serverless computing environment 612 to execute the computing process 610, where the second amount of computing resources 622 are assigned to implement the second node 626. The computing process 610 may be executed within the serverless computing environment 612 using both the first and second nodes 614, 626.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
   receiving a request to execute a computing process in a serverless computing environment;
   creating a first node within the serverless computing environment to execute the computing process, wherein a first amount of computing resources are assigned to implement the first node;
   determining that computing resources necessary to implement the first node exceeds the first amount of computing resources;
   determining, with a vertical autoscaling (VA) process which executes on a first computing unit, a second amount of computing resources to include in an updated request;
   intercepting, at a second computing unit, the updated request and providing the updated request including the second amount to a horizontal autoscaling (HA) process which executes on the second computing unit;
   creating, using the HA process, a second node within the serverless computing environment to execute the computing process, wherein the second amount of computing resources are assigned to implement the second node; and
   executing the computing process within the serverless computing environment using both the first and second nodes.

2. The method of claim 1, wherein the first amount of computing resources remains assigned to the first node after the second node is created.

3. The method of claim 1, wherein the second amount of computing resources is initially determined by the VA process as an increase in computing resources for the first node.

4. The method of claim 3, wherein the second amount of computing resources is determined as a proportion of the first amount of computing resources.

5. The method of claim 3, wherein the second amount of computing resources is determined based on at least one of processing utilization by the first node, memory utilization by the first node, and a total request load for the first node.

6. The method of claim 1, wherein the request identifies minimum and maximum computing resources for the computing process.

7. The method of claim 6, wherein the computing resources include memory capacity available to the computing process and processing capacity available to the computing process.

8. The method of claim 6, wherein the first amount of computing resources is allocated based on the minimum and maximum computing resources.

9. The method of claim 1, further comprising updating a routing table with a first weight for the first node and a second weight for the second node, wherein the first weight is determined based on the first amount of computing resources and the second weight is determined based on the second amount of computing resources.

10. The method of claim 9, further comprising proportionally routing requests for the computing process to be fulfilled by the first and second nodes based on relative magnitudes of the first and second weights, and wherein the weights are normalized such that the smallest weight has a value of 1.

11. The method of claim 9, further comprising:
    detecting that a number of requests for the computing process has decreased by more than a predetermined threshold; and
    halting at least one of the first and second nodes.

12. The method of claim 11, wherein the at least one of the first and second nodes is selected based on the first weight and the second weight.

13. A system comprising:
    a processor; and
    a memory storing instructions which, when executed by the processor, cause the processor to:
        receive a request to execute a computing process in a serverless computing environment;
        create a first node within the serverless computing environment to execute the computing process, wherein a first amount of computing resources are assigned to implement the first node;
        determine that computing resources necessary to implement the first node exceeds the first amount of computing resources;
        determine, with a vertical autoscaling (VA) process which executes on a first computing unit, a second amount of computing resources to include in an updated request;
        intercept, at a second computing unit, the updated request and providing the updated request including the second amount to a horizontal autoscaling (HA) process which executes on the second computing unit;
        create, using the HA process, a second node within the serverless computing environment to execute the computing process, wherein the second amount of computing resources are assigned to implement the second node; and
        execute the computing process within the serverless computing environment using both the first and second nodes.

14. The system of claim 13, wherein the first amount of computing resources remains assigned to the first node after the second node is created.

15. The system of claim 13, wherein the second amount of computing resources is initially determined by the VA process as an increase in computing resources for the first node.

16. The system of claim 15, wherein the second amount of computing resources is determined as a proportion of the first amount of computing resources.

17. The system of claim 13, wherein the instructions further cause the processor to update a routing table with a first weight for the first node and a second weight for the second node, wherein the first weight is determined based on the first amount of computing resources and the second weight is determined based on the second amount of computing resources.

18. The system of claim 17, wherein the instructions further cause the processor to proportionally route requests for the computing process to be fulfilled by the first and second nodes based on relative magnitudes of the first and second weights.

19. The system of claim 17, wherein the instructions further cause the processor to:
    detect that a number of requests for the computing process has decreased by more than a predetermined threshold; and
    halt at least one of the first and second nodes.

20. A non-transitory, computer-readable medium storing instructions which, when executed by a processor, cause the processor to:
    receive a request to execute a computing process in a serverless computing environment;
    create a first node within the serverless computing environment to execute the computing process, wherein a first amount of computing resources are assigned to implement the first node;
    determine that computing resources necessary to implement the first node exceeds the first amount of computing resources;
    determine, with a vertical autoscaling (VA) process which executes on a first computing unit, a second amount of computing resources to include in an updated request;
    intercept, at a second computing unit, the updated request and providing the updated request including the second amount to a horizontal autoscaling (HA) process which executes on the second computing unit;
    create, using the HA process, a second node within the serverless computing environment to execute the computing process, wherein the second amount of computing resources are assigned to implement the second node; and
    execute the computing process within the serverless computing environment using both the first and second nodes.

* * * * *